United States Patent [19]

Cassidy

[11] Patent Number: 5,531,220
[45] Date of Patent: Jul. 2, 1996

[54] GAS SUPPLY SYSTEMS

[75] Inventor: Ronald F. Cassidy, Waterlooville, United Kingdom

[73] Assignee: Pall Corporation, East Hills, N.Y.

[21] Appl. No.: 207,686

[22] Filed: Mar. 9, 1994

[30] Foreign Application Priority Data

Mar. 10, 1993 [GB] United Kingdom ............... 9304858

[51] Int. Cl.⁶ .................... A61M 16/00; B01D 53/00
[52] U.S. Cl. .............. 128/204.29; 128/205.12; 128/205.29; 128/203.25; 95/121; 95/139; 96/126
[58] Field of Search .................... 95/19, 21, 22, 95/121, 139; 128/204.18, 204.29, 205.12, 205.24, 205.27, 205.28, 205.29, 206.26, 203.25; 96/126; 244/163

[56] References Cited

U.S. PATENT DOCUMENTS

| | | | |
|---|---|---|---|
| 3,069,830 | 12/1962 | Skarstrom et al. | 96/126 |
| 4,428,372 | 1/1984 | Beysel et al. | 128/202.26 |
| 4,517,813 | 5/1985 | Eggebrecht et al. | 62/284 |
| 4,681,602 | 7/1987 | Glenn et al. | 55/21 |
| 4,786,294 | 11/1988 | Jonqueres et al. | 95/139 |
| 4,927,434 | 5/1990 | Cordes et al. | 55/20 |
| 5,169,415 | 10/1992 | Roettgers et al. | 128/204.29 |
| 5,199,423 | 4/1993 | Harral et al. | 128/204.29 |

FOREIGN PATENT DOCUMENTS

| | | | |
|---|---|---|---|
| 0332390 | 9/1989 | European Pat. Off. | |
| 2029257 | 3/1980 | United Kingdom | 95/22 |

OTHER PUBLICATIONS

"NBC Protected OBOGS" Donald H. White, Jr. and John P. Miller; 1991 Safe Symposium, Las Vegas, Nevada; Pall Corporation; Nov. 11, 1991.

Primary Examiner—Ren Yan
Assistant Examiner—V. Srivastava
Attorney, Agent, or Firm—Leydig, Voit & Mayer

[57] ABSTRACT

In an aircraft, a pressure swing adsorption system (23) is used both for removing carbon dioxide and water vapour from recycled cabin air and for producing in an emergency oxygen from pressurized engine bleed air.

15 Claims, 1 Drawing Sheet

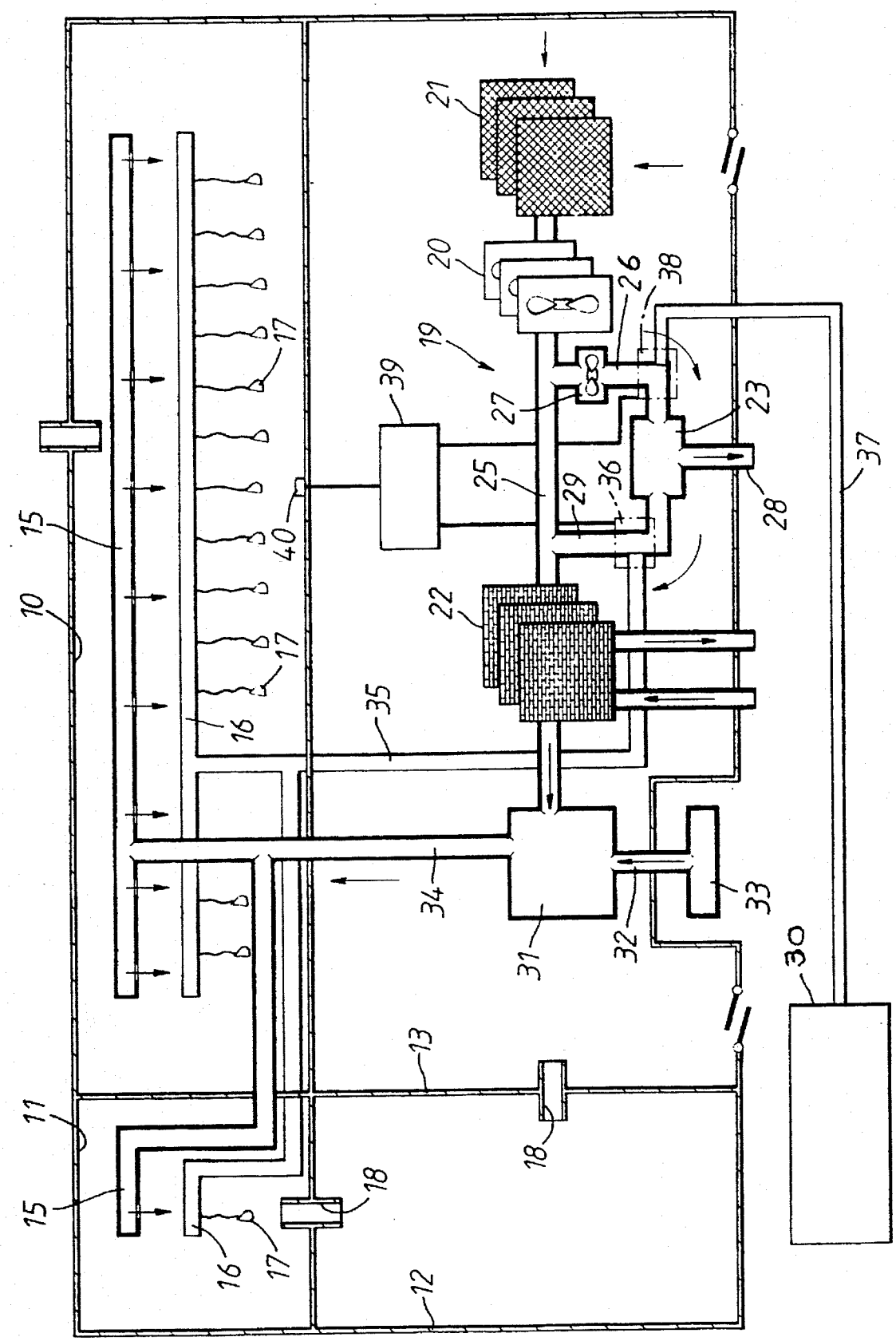

GAS SUPPLY SYSTEMS

BACKGROUND TO THE INVENTION

1. Field of the Invention

The invention relates to the alteration of the composition of gas supplied to an enclosed space and is particularly applicable to aircraft.

An example of an enclosed space which requires gases of differing compositions is the space formed by the passenger and crew carrying zones of an aircraft. In commercial aircraft, air for passengers in the cabin and for the crew in the flight deck is derived from a source external to the cabin and flight deck. In order to reduce the requirement for air from such an external air supply, an air re-circulation system is commonly provided in which air from the flight deck and cabin is taken, filtered and cooled and then returned to the cabin and the flight deck, often with the addition of a small proportion of fresh air. The air from the cabin and flight deck contains significant quantities of carbon dioxide and water vapour. In order to reduce the volume of carbon dioxide and water vapour in the recycled air, a proportion of the recycled air is passed through a pressure swing adsorption system which removes carbon dioxide and water vapour and returns the carbon dioxide and water vapour depleted air to the remainder of the recycled air, which is then returned to the cabin and flight deck.

2. Brief Review of the Prior Art

Suitable pressure swing adsorption systems are well known and are described, for example, in EP-A-0332390.

There is also a requirement in aircraft for a supply of oxygen in emergency in the event of cabin and/or flight deck depressurization. This is achieved by the use of a separate system including masks for the passengers and the flight deck crew supplied from a separate source of oxygen. For example, there are available candles which on combustion release oxygen.

An alternative is disclosed in U.S. Pat. No. 4,428,372 where a pressure swing adsorption system takes engine bleed air, increases the oxygen content of the air by the adsorption of nitrogen and then supplies the oxygen-rich air to an amergency oxygen supply system. Some oxygen-rich air from the pressure swing adsorption system is supplied to a storage tank and is drawn from the tank in the event that there is an interruption in the supply of oxygen-enriched air from the pressure swing adsorption system.

SUMMARY OF THE INVENTION

According to a first aspect of the invention, there is provided a method of changing the composition of a gas in an enclosed space comprising supplying a first gas having a first composition from said enclosed space to a pressure swing adsorption system, modifying the composition of said first gas with said system and supplying said modified gas to said enclosed space, and then halting said supply of first gas to the pressure swing adsorption system, supplying a second gas having a second composition to said pressure swing adsorption system from outside said enclosed space, modifying the composition of said second gas and supplying said modified second gas to the enclosed space.

According to a second aspect of the invention, there is provided a gas supply system comprising an enclosed space including a first gas having a first composition, a pressure swing adsorption system having a first outlet connected to said space and a second outlet connected to said space, an inlet leading to the pressure swing adsorption system from said enclosed space and a supply of a second gas having a second composition connected to the pressure swing adsorption system, said pressure swing adsorption system including an adsorbent capable of modifying the composition of both the first and second gases, control means for connecting the enclosed space to the pressure swing adsorption system when the first outlet is open and the second outlet is closed so that the enclosed space receives modified first gas and for halting the supply of said first gas to the pressure swing adsorption system and connecting the supply of second gas to the pressure swing adsorption system when the second outlet is open and the second outlet is closed so that the enclosed space receives modified second gas.

BRIEF DESCRIPTION OF THE DRAWING

The following is a more detailed description of an embodiment of the invention, by way of example, reference being made to the accompanying drawing which is a schematic view of an aircraft showing a cabin and a flight deck of the aircraft together with cargo/underfloor compartments in which is installed a pressure swing adsorption system both for treating re-circulated air and for supplying emergency oxygen.

DESCRIPTION OF THE PREFERRED EMBODIMENTS

Referring to the drawing, the aircraft comprises a passenger cabin 10, a flight deck 11, and underfloor compartments 12,13. The aircraft also includes at least one engine 14.

The cabin 10 and the flight deck 11 contain two breathable gas outlet systems. The first outlet system 15 supplies air to the cabin 10 and the flight deck 11 during normal operation of the aircraft. The second system 16 is an emergency oxygen system provided with masks 17 through which persons on the aircraft can receive oxygen or oxygen rich air should the cabin 10 and the flight deck 11 become depressurized in an emergency. In normal operation, air from the air outlet system 15 passes into the cabin 10 and flight deck 11 and circulates through the first underfloor compartment 12 and through vents 18 to the second underfloor compartment 13. In the second underfloor compartment 13, there is a cabin air recycling system indicated generally at 19. In this system 19, air within the compartment 13 is drawn by fans 20 through particle/odour filters 21. The filtered air is then passed to heat exchangers 22 and through a duct 25 with a proportion of such ducted air being passed to a pressure swing adsorption system 23. The air is bled from the duct 25 to the pressure swing adsorption system 23 through a branch duct 26, being drawn into the system 23 by a fan 27. Such systems are well known in the art and comprise a pair of adsorption columns, with the air being directed through each column in turn. While one column is performing the adsorption function, the other column is being purged. Such a pressure swing adsorption system is shown, for example, in EP-A-0332390.

The purge flow from the pressure swing adsorption system 23 passes to the exterior of the aircraft through an outlet 28. The system 23 works on the pressure differential between pressure in the cabin 10 and the flight deck 11, on the one hand, and the ambient air pressure on the other.

The function of the pressure swing adsorption system 23 in this mode of operation is to alter the composition of the air by removing carbon dioxide and water vapour from the air supply and the adsorbent in the columns is chosen accordingly. After the adsorption of these components, the modified air is returned through an outlet duct 29 to join the air in the duct 25 that has not passed through the system 25. The total airflow then passes to the heat exchangers 22.

The heat exchangers 22 take ambient air from the exterior of the aircraft and use the cool ambient air to cool the recycled air to a desired temperature. The cooled air then passes to a mixer unit 31. This unit 31 also has an inlet 32 which receives ambient air after filtration of the ambient air by a filter unit 33. The mixer unit 31 mixes the recycled air and the filtered ambient air. In general, the volume of ambient air added will be small in relation to the volume of recycled air.

The mixed air then passes to the air outlet system 15 through supply ducts 34.

The oxygen system 16 receives oxygen from an oxygen supply duct 35 which branches from the outlet duct 29 of the pressure swing adsorption system 23. A first valve 36 controls the flow so that in a first position of the first valve the flow of treated air passes through the duct 29 to re-join the remainder of the recycled air in the duct 25 (as described above), and, in a second position of the first valve 36, the output from the pressure swing adsorption system 23 passes to the oxygen supply duct 35.

The engine 30 is provided with a pressurized air bleed line 37 which leads to the branch duct 26 forming the inlet to the pressure swing adsorption system 23. A second valve 38 controls flow through the branch duct 26 and the air bleed line 37 so that in a first position of the second valve 38 the branch duct 26 is open upstream of the second valve 38 and recycled air passes to the pressure swing adsorption system 23 under the control of the fan 27. The air bleed line 37 is closed. In a second position of the second valve 38, the branch duct 26 is closed, upstream of the second valve 38 is closed and the air bleed line 37 is open and pressurized bleed air from the engine 30 is supplied to the pressure swing adsorption system 23 through the air bleed line 37.

The first and second valves 36,38 are controlled by a control unit 39 which also has as an input a signal from a cabin pressure sensor 40.

When the pressure sensor 40 senses a decrease in pressure in the cabin 10 sufficient to require the supply to persons within the cabin 10 and the flight deck 11 of oxygen or oxygen rich air, the control unit 39 switches the valves 36,38 from their first positions in which recycled air is processed by the pressure swing adsorption system 23 to their second positions in which the supply of such air to the pressure swing adsorption system 23 is halted and bleed air from the engine 30 is supplied to the pressure swing adsorption system 23 whose adsorbent is capable of adsorbing nitrogen, as well as carbon dioxide. Such adsorbents are well known in the art. Since this bleed air is at a significantly higher pressure, it is necessary to switch the pressure swing adsorption system 23 to a very much more rapid cycle time so that it acts to modify the composition of the bleed air by removing nitrogen from the bleed air and provides a supply of oxygen-enriched air which, on leaving the pressure swing adsorption system 23 passes through the oxygen supply duct 35 to the oxygen system 16 and the masks 17.

In this way, a single pressure swing adsorption system can be used both for regenerating recycled cabin air and for supplying emergency oxygen. This reduces significantly the weight and complexity of the equipment required for these purposes in an aircraft.

Of course, the system need not be used solely for aircraft. It could be used to charge the composition of gas in any enclosed space with the pressure swing adsorption system modifying the composition of a first gas from the space and passing it back to the space and then modifying the composition of a second gas from a second supply outside the enclosed space and passing it to the enclosed space.

In certain circumstances oxygen from a separate supply may be added to the oxygen supplied by the pressure swing adsorption system.

I claim:

1. A method of changing the composition of a gas in an enclosed space
   (a) comprising supplying a first gas having a first composition from said enclosed space to a pressure swing adsorption system,
   (b) modifying the composition of said first gas with said system,
   (c) supplying said modified gas to said enclosed space,
   (d) then halting said supply of first gas to the pressure swing adsorption system,
   (e) supplying a second gas having a second composition to said pressure swing adsorption system from outside said enclosed space,
   (f) modifying the composition of said second gas and
   (g) supplying said modified second gas to the enclosed space.

2. A method according to claim 1 wherein the first gas is supplied to the pressure swing adsorption system at a pressure that is less than the pressure at which the second gas is supplied to the pressure swing adsorption system, the pressure swing adsorption system having a cycle time adjusted in accordance with said pressures.

3. A method according to claim 2, wherein the first gas is air re-cycled from the enclosed space, the pressure swing adsorption system removing carbon dioxide water vapour from said air, the second gas being air derived from an external source of pressurized air, the pressure swing adsorption system removing nitrogen to produce oxygen-enriched air for supply to the enclosed space.

4. A method according to claim 3 wherein the enclosed space is within an aircraft, the second gas being pressurized bleed air from an engine of the aircraft.

5. A gas supply system comprising:
   an enclosed space including a first gas having a first composition,
   a pressure swing adsorption system having a first outlet connected to said space and a second outlet connected to said space, said pressure swing adsorption system including an adsorbent,
   an inlet leading to the pressure swing adsorption system from said enclosed space,
   a supply of a second gas having a second composition connected to the pressure swing adsorption system, the adsorbent of the pressure swing adsorption system being capable of modifying the composition of both the first and second gases, and
   a controller connecting the enclosed space to the pressure swing adsorption system when the first outlet is open and the second outlet is closed so that the enclosed space receives modified first gas and halting the supply of said first gas to the pressure swing adsorption system and connecting the supply of second gas to the pressure swing adsorption system when the second outlet is open and the first outlet is closed so that the enclosed space receives modified second gas.

6. A system according to claim 5 wherein the first gas is air, the pressure swing adsorption system modifying the air by removing carbon dioxide and water vapour from said air.

7. A system according to claim 5 wherein the supply of second gas is at a pressure higher than the pressure of the supply of first gas.

8. A system according to claim 7 wherein the supply of second gas is air derived from a source externally of the enclosed space.

9. A system according to claim 8 wherein the enclosed space is within an aircraft, the supply of said second gas is an engine of the aircraft from which air under pressure is bled to the pressure swing adsorption system.

10. A method of supplying gas to an aircraft comprising:
supplying a first gas from an enclosed space within an aircraft to a gas adsorption system;
modifying the composition of the first gas with the adsorption system;
supplying the modified first gas to the enclosed space;
halting the supply of the first gas to the adsorption system and then supplying a second gas from outside the enclosed space to the adsorption system;
modifying the composition of the second gas with the adsorption system; and
supplying the modified second gas to the enclosed space.

11. The method according to claim 10 including supplying the modified first gas to the enclosed space through a vent for nonemergency air and supplying the modified second gas to the enclosed space through an emergency breathing mask.

12. The method according to claim 11 including supplying the modified first gas and the modified second gas to the enclosed space through separate supply ducts.

13. The method according to claim 10 including preventing supply of the first gas to the adsorption system while supplying the second gas to the adsorption system.

14. The method according to claim 10 comprising supplying the first gas to the adsorption system when the pressure in the enclosed space is above a predetermined value and supplying the second gas to the adsorption system when the pressure in the enclosed space is below the predetermined value.

15. The method according to claim 10 wherein the adsorption system comprises a pressure swing adsorption system, the method including operating the adsorption system with a first cycle time when supplying the first gas to the adsorption system and operating the adsorption system with a second cycle time shorter than the first cycle time when supplying the second gas to the adsorption system.

* * * * *